United States Patent [19]
Kraiczek et al.

[11] Patent Number: 5,750,978
[45] Date of Patent: May 12, 1998

[54] METHOD AND APPARATUS FOR TEMPERATURE COMPENSATED OPTICAL SENSOR MOUNTING

[75] Inventors: Karsten G. Kraiczek, Karlsbad; Uwe Effelsberg, Waldbronn, both of Germany

[73] Assignee: Hewlett-Packard Company, Palo Alto, Calif.

[21] Appl. No.: 598,718

[22] Filed: Feb. 8, 1996

[30] Foreign Application Priority Data

Feb. 17, 1995 [EP] European Pat. Off. .............. 95102210

[51] Int. Cl.$^6$ ...................................................... H01J 3/14
[52] U.S. Cl. .............................................. 250/216; 250/548
[58] Field of Search ................................... 250/216, 239, 250/548, 559.29, 559.38, 559.39; 356/399–401

[56] References Cited

U.S. PATENT DOCUMENTS

| | | | |
|---|---|---|---|
| 4,972,079 | 11/1990 | Blanding | 250/239 |
| 5,111,041 | 5/1992 | Imai | 250/216 |
| 5,115,125 | 5/1992 | Biggs | 250/239 |

OTHER PUBLICATIONS

Patent Abstracts of Japan vol. 16, No. 354 (E–1242) 30 Jul. 1992 & JP-A-04 111 686 (Canon Inc) 13 Apr. 1992 *abstract*.

Database WPI Derwent Publications Ltd., London, GB; AN 91–211213 & JP-A-3 132 934 (Konica Corp) 6Jun. 1991 *abstract*.

Patent Abstracts of Japan vol. 13, No. 235 (E–766) 30 May 1989 & JP-A-01 041 383 (Canon Inc) 13 Feb. 1989 *abstract*.

Patent Abstracts of Japan vol. 9, No. 97 (p–352) 26 Apr. 1985 & JP-A-59 223 951 (Hitachi Seisakusho KK) 15 Dec. 1984 *abstract*.

Database WPI Derwent Publications Ltd., London, GB; AN 84–052218 & JP-A-59 010 264 (Hitachi KK) 9 Jul. 1982 *abstract*.

*Primary Examiner*—Que Le
*Attorney, Agent, or Firm*—Augustus W. Winfield

[57] ABSTRACT

A method and apparatus for mounting an optical sensor in an optical instrument. The optical sensor is attached to a rigid substrate. The substrate has two locator holes, with the sensor mounted between the holes. Rigid locator pins attached to the housing of the instrument protrude into the locator holes. A spring pushing against the substrate forces the locator holes against corresponding locator pins, aligning the substrate within a plane. In a first embodiment, the holes are positioned so that the optical sensor is rigidly held at its midpoint, minimizing dimensional deviations along the length of the sensor with temperature change. The sensor assembly is easily removable and the mounting apparatus does not mechanically stress the substrate or the sensor with temperature changes. The mounting apparatus is easily manufactured, allows precise alignment, and is inexpensive.

2 Claims, 1 Drawing Sheet

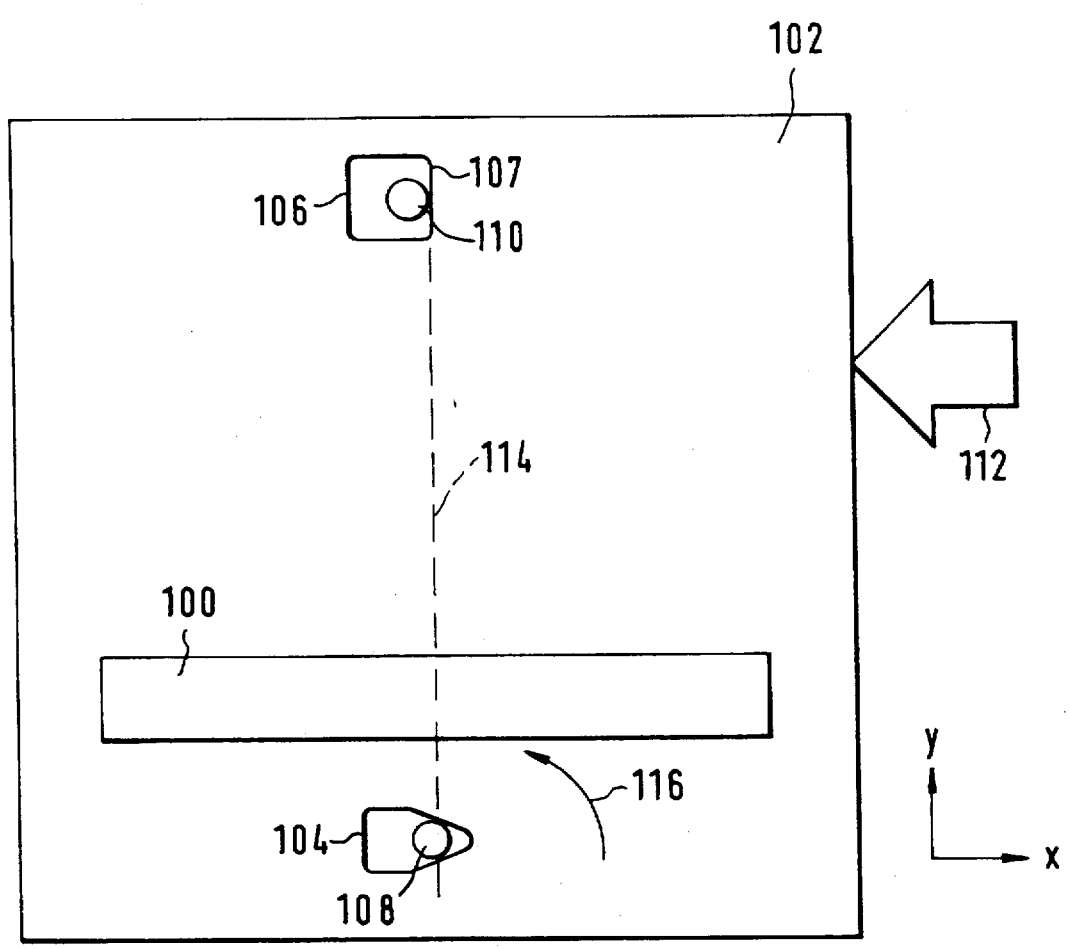

METHOD AND APPARATUS FOR TEMPERATURE COMPENSATED OPTICAL SENSOR MOUNTING

BACKGROUND OF THE INVENTION

1. Field of Invention

This invention relates generally to mounting semiconductor devices on substrates and more specifically to minimizing the effects of thermally caused dimensional changes in optical sensors.

2. Description of the Prior Art

Optical instruments with high precision and resolution require the positioning and mounting of their optical components within very small tolerances. In addition, high precision and resolution require that the position of these optical components remains stable with time and temperature changes. Spectrometers used in analytical chemistry instrumentation are extremely demanding in this respect. A spectrometer typically has an optical slit, an optical grating and an optical sensor, all of which must be held in position to within very small tolerances. As all materials exhibit dimensional change with temperature, a design must be found which minimizes or compensates for these changes.

Photosensor arrays, typically comprised of photodiodes or charge coupled devices, are usually made of semiconductor materials like Si or GaInAs and have a relatively long and narrow shape. The semiconductor materials are typically packaged in ceramic packages or mounted on ceramic substrates. The thermal expansion rate of the photosensor arrays and their associated ceramic substrates typically does not match the thermal expansion rate of the other optical components or of the mounting or housing for the other optical components. This thermal expansion mismatch limits the performance of optical instruments using photosensor arrays.

One known mounting technology uses a printed circuit board to hold a plastic or ceramic package, which package in turn holds the semiconductor array. The primary advantages of this technology are low cost and easily replaceable parts. However, there are relatively large tolerances involved in soldering the package to the printed circuit board, in the thermal expansion effects of solder, and in the thermal expansion characteristics of the printed circuit board material.

An improved mounting technique for a photosensor array mounts the array on a ceramic substrate. The combined array and substrate is then mounted on hold points at the edges of the substrate at fixed positions. Although this technique is inexpensive and allows for easy parts replacement, there is some finite positional tolerance of the array relative to the edges of the substrate. Given thermal mismatches between the semiconductor material, the package material, and the substrate, thermal changes result in increasing deviations from the ideal position of the array with respect to the fixed mounting points. Typically, no point on the array stays at its ideal position during thermal cycling.

The array package can be mounted directly to the instrument housing using adhesive. With proper adhesive technology, the position of the middle of the sensor can be substantially fixed. Deviation due to thermal expansion is minimized along the length of the array. Unfortunately, adhesives have unpredictable thermal mechanical characteristics, make the removal of the sensor array difficult, and can cause mechanical stress on the array package due to mismatches between the thermal mechanical characteristics of the adhesive, the instrument housing and the array package.

Active or passive thermal compensation can be used. The additional components required will typically increase the size and complexity of the instrument, and add cost.

There is a need for an improved mounting technology providing predictable minimal deviations with thermal change along the length of the sensor array. Easy replacement of the sensor array, low cost, small size and low complexity are also desirable.

SUMMARY OF THE INVENTION

An object of the invention is to mount an optical sensor in a manner that provides predictable minimal deviations with thermal change along the length of the array. The mount also generates minimal stress on the sensor during thermal change, is easily replaced, inexpensive, simple and small.

An optical sensor is attached to a rigid substrate. The substrate has two locator holes, with the sensor mounted between the holes. Rigid locator pins attached to the housing or another desirable location of the instrument protrude into the locator holes. A spring pushing against the substrate forces the locator holes against the corresponding locator pins, aligning the substrate within a plane. The holes are positioned in a first embodiment so that the optical sensor is rigidly held at its midpoint, minimizing dimensional deviations along the length of the sensor with temperature change. The sensor assembly is easily removable. The mounting apparatus does not mechanically stress the substrate or the sensor during thermal cycling. The mounting apparatus is inexpensive, easily manufactured, and permits the precise mounting of the optical sensor.

BRIEF DESCRIPTION OF THE DRAWING

FIG. 1 is a top plane view of a photosensor array assembly with mounting features in accordance with the invention.

DESCRIPTION OF THE PREFERRED EMBODIMENTS

FIG. 1 illustrates an optical sensor 100 attached to a rigid substrate 102. The substrate 102 has two locator holes 104 and 106. Locator hole 104 has two edges forming a V or L shaped corner. Locator hole 106 has one locator edge 107. Other than the two edges which form the V or L shaped corner of hole 104 and edge 107 of hole 106, the shape of holes 104 and 106 is not important. Two cylindrical locator pins 108 and 110 are part of the housing of an optical instrument (not illustrated). The two locator pins protrude into the two locator holes as illustrated. Dashed line 114 depicts the midpoint of the length of the active portion of the photosensor array. In a first preferred embodiment, the midpoint of the array is aligned with the 656 nm spectral line generated by the illuminating lamp, which minimizes distortion for absorption spectroscopy. In other embodiments, the midpoint of the array could be fixed to align with other spectral lines, or it could be fixed to align with the middle of the instrument, in which position it would minimize the overall mechanical distortion.

A simple flat spring (not illustrated) provides a force 112 against substrate 102. The location and the source of this aligning force is not critical to the proper functioning of the present invention. Locator hole 104 is V shaped. Force 112 forces the V shaped locator hole 104 against locator pin 108. Force 112 also causes substrate 102 to rotate around locator pin 108 counterclockwise (as illustrated by arrow 116) to force edge 107 of locator hole 106 against locator pin 110. Other precision pads (not illustrated) and spring forces define three points in a plane to fix the plane of the substrate.

Forcing the V shaped sides of locator hole 104 against locator pin 104 aligns locator hole 104 in both the X and Y directions. Forcing side 107 of locator hole 106 against locator pin 110 aligns locator hole 106 in the X direction. Locator hole 106 is free to move in the Y direction. By aligning two points in the X direction and one point in the Y direction, the substrate 102 is aligned within the plane of the substrate.

In a specific embodiment, the optical sensor 100 is a photodiode array used in a spectrometer for analytical chemistry. Substrate 102 is ceramic. Locator holes 104 and 106 are cut with a laser and their corners are rounded to prevent cracking.

The mounting scheme illustrated in FIG. 1 has several advantages. In one embodiment, the sensor's midpoint is fixed, fixing at least one point during thermal cycling and minimizing deviations along the length of the array. The sensor assembly is easily replaceable as it simply snaps into place. The location holes are easily and precisely fabricated using laser cutting. The edges used for alignment are not as exposed as the outer edges of the substrate, reducing damage during handling and resulting in greater reliability. As locator hole 106 fixes the sensor in only the X direction, the sensor can move in the Y direction during thermal cycling, eliminating mechanical stress caused by the cycling.

What is claimed is:

1. A method for aligning an optical sensor, the method comprising the steps of:

forming a first and second locator hole in a substrate, the first locator hole having a corner;

mounting the optical sensor on the substrate between the first and second locator holes:

mounting the substrate on a first and second locator pin, the first locator pin inserting into the first locator hole and the second locator pin inserting into the second locator hole; forcing the corner of the first locator hole against the first locator pin thereby aligning the first locator hole in two orthogonal directions; and forcing the second locator hole against the second locator pin aligning the second locator hole in one of two orthogonal directions while permitting the second locator hole to move along of the orthogonal directions.

2. An apparatus for aligning an optical sensor in first and second orthogonal directions, the apparatus comprising:

a substrate;

a first locator hole in the substrate, the first locator hole having a corner;

a second locator hole in the substrate;

the optical sensor mounted onto the substrate between the first and second locator holes;

a first locator pin protruding into the first locator hole;

a second locator pin protruding into the second locator hole;

wherein the corner of the first locator hole is held against the first locator pin so that the corner is permitted to rotate around the first locator pin; and wherein the second locator hole is held against the second locator pin so that the position of the second locator hole is fixed along the first orthogonal direction and is permitted to vary along the second orthogonal direction.

* * * * *